United States Patent

[11] 3,603,450

[72] Inventors Leon A. Chamberlain;
 Clarence R. Campbell; Leif T. Stokes, all of
 Salt Lake City, Utah
[21] Appl. No. 851,897
[22] Filed Aug. 21, 1969
[45] Patented Sept. 7, 1971
[73] Assignee Envirotech Corporation
 Salt Lake City, Utah

[54] ENCLOSED BELT CONVEYOR
 11 Claims, 7 Drawing Figs.
[52] U.S. Cl. .................................................... 198/198
[51] Int. Cl. ..................................................... B65g 15/42
[50] Field of Search .......................................... 198/198,
 129, 227, 168

[56] References Cited
 UNITED STATES PATENTS
2,163,353  6/1939  Roth .............................. 198/168
2,281,026  4/1942  Sinden ........................... 198/168
3,306,218  2/1967  Reeves ........................... 198/129

*Primary Examiner*—Edward A. Sroka
*Attorneys*—Robert R. Finch and Richard F. Bojanowski ABSTRACT: A belt conveyor is disclosed in which the belt is equipped with upwardly projecting material-engaging fingers and wherein at least that section of the working run which passes between feed and discharge is enclosed by a close-fitting conduit. A belt construction is also disclosed whereby at least part of the material-engaging fingers are constructed from or tipped with a low-friction abrasion-resistant material to provide bearing elements. In some cases, only part of the material-engaging bearing fingers serve as bearing elements. In such instances, the bearing element fingers extend outwardly to a greater distance than the other fingers and serve as spacers holding the nonbearing fingers away from the conduit. The underside of the belt may also be provided with relatively thin abrasion-resistant bearing elements.

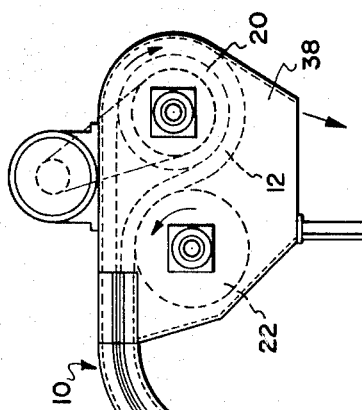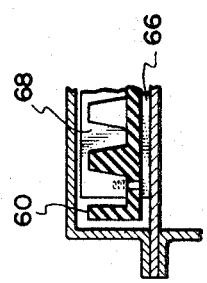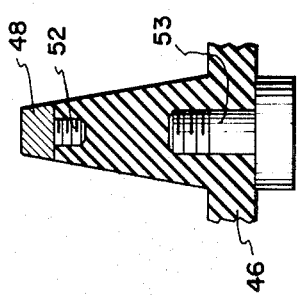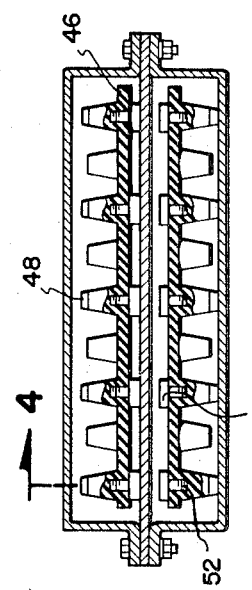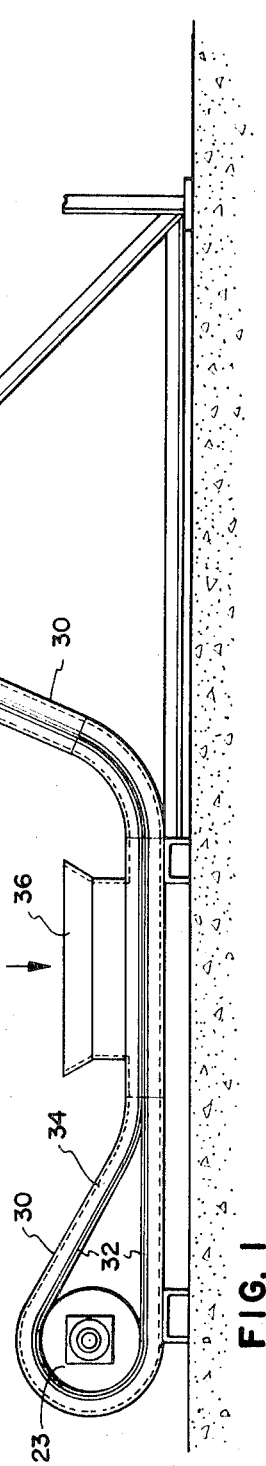
INVENTORS
CLARENCE R. CAMPBELL
LEON A. CHAMBERLAIN
LEIF T. STOKES
ATTORNEYS

ENCLOSED BELT CONVEYOR

BACKGROUND OF THE INVENTION

1. Field of the Invention

This invention relates generally to belt conveyors and in particular to a belt conveyor of the type having a working and return run, with the working run passing through a close-fitting conduit and wherein the working surface of the belt is equipped with material-engaging members.

2. Description of the Prior Art

Conveyors employing belts running in closed tubes or conduits and equipped with material-engaging members such as fingers for conveying flowable materials have recently come into use and are finding broad acceptance in many areas for moving and elevating materials.

In conveyors of this type, it is possible to subject the belt to a reverse bend and to angle it upwardly from the horizontal to discharge at a higher elevation, making it especially useful in conveying flowable type materials.

In such constructions, as the belt turns upwardly in a reverse bend, the fingers bear against idler pulleys at the point of turning or bending, thus causing bending and weakening of the fingers. This form of construction has the further disadvantage of higher initial cost because of the pulleys and the need to enclose them in the conduit through which the materials are conveyed. Moreover, maintenance expense is high due to the extra care required to keep the areas containing the pulleys free from materials that may spill off the belt.

OBJECTS OF THE INVENTION

It is a primary object of this invention to provide a belt conveyor of the type described in which reverse turns are made with a minimum number of pulleys, thus avoiding the installation and maintenance costs resulting therefrom.

Another object is to provide a conveyor system in which guidance of the belt through the curved or bent conduit is effected by bearing means projecting outwardly from the belt's surface, which also serves as material-engaging projections for conveying.

Still another object is to provide a conveyor belt having nonbearing material-engaging fingers projecting from its working surface in combination with a plurality of spaced-apart bearing means extending outward from the same belt surface beyond the fingers to slidably contact the inner walls of a conduit enclosing the belt's working run and thereby prevent contact of the nonbearing material-engaging fingers with the walls of the conduit.

Another object is to provide a conveyor system wherein the lateral movement of the conveyor belt is limited.

Other objects of this invention will be more readily apparent from the disclosure and drawings which follow.

SUMMARY OF THE INVENTION

These and other objects of this invention are attained by a conveyor which comprises generally an enclosed conveyor belt having a plurality of spaced-apart, low-friction slide members extending outwardly from at least the upper surface of the belt for slidable contact with a walled conduit through which the belt moves.

The low-friction slide members are arranged on the belt so that the entire surface from which they extend is spaced from the conduit walls. This minimizes belt drag and avoids serious frictional wear of the belt's surface as the belt passes through the conduit and particularly as the belt is negotiating bends or turns within the conduit.

There is also illustrated a further modification which includes means in the belt enclosure for tracking or guiding the belt in a fixed longitudinal path to thus prevent the sides of the belt from abrading against the conduit sidewalls.

BRIEF DESCRIPTION OF THE DRAWINGS

FIG. 1 is a side view of a conveyor embodying the invention, certain portions being cut away and internal parts shown in dotted lines for purposes of clarity.

FIG. 2 is a sectional view taken in the plane of line 2—2 of FIG. 1.

FIG. 3 is a sectional view similar to FIG. 2 but illustrating a modified embodiment of this invention.

FIG. 4 is an enlarged sectional view of the material-engaging members shown in FIG. 3.

FIG. 5 is a sectional view similar to FIG. 2, but illustrating a different embodiment of the invention.

DESCRIPTION OF THE PREFERRED EMBODIMENT

Figure 6:
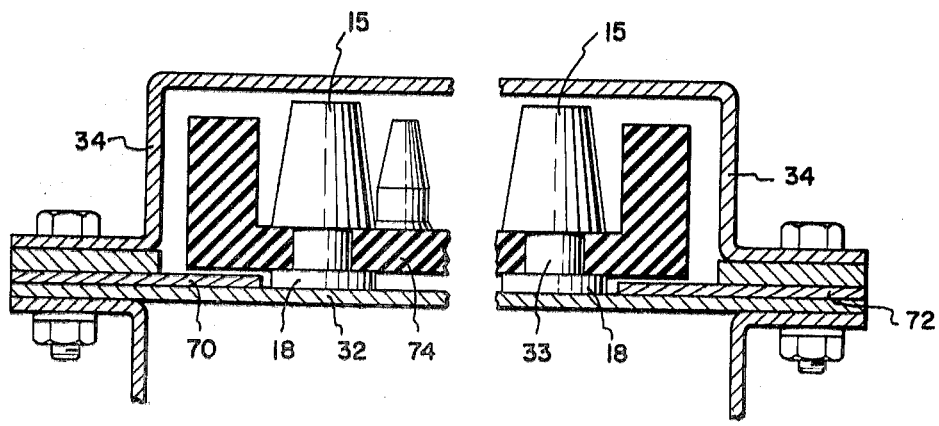
FIGS. 6 and 7 are sectional views similar to FIG. 2, illustrating still other variations or embodiments of this invention.

Referring to the drawings, numeral 10 designates generally the conveyor apparatus of this invention.

As shown, a continuous or endless flexible belt 12 has low-friction slide members 14 extending upwards from its outer or working surface 16 and other low-friction slide members 18 extending downward from its under surface 19. The belt is trained about a drive pulley 20, a first idler pulley 22 and a second idler pulley 23. The belt passes through a closed conduit or tube 24 which provides enclosures 26 and 28 for both the working run and return run of the belt respectively. As will be described more fully hereinafter, the idler and drive pulleys are both located adjacent the same end of the conveyor. The conduit has an outer wall 30, and inner wall 32, and side walls 34. The conduit, in combination with the low-friction slide members 14 and 18, enables the belt to negotiate turns within the conduit with a minimum of frictional resistance and belt strain. A feed inlet 36 and feed outlet 38 are located at opposite ends of the conduit enclosing the working run.

In other words, except for pulleys associated with driving of the belt or in negotiating turns of 180° or greater, the conduit which encloses the working run of the belt (between inlet and outlet) is unbroken; that is, it is not interrupted by pulleys. Guidance of the belt is achieved by the walls of the conduit and the low-friction slide members extending from the belt's surface.

The elimination of internal intermediate rollers along the working surface of the belt eliminates the need for special high-cost bearing constructions and avoids the special maintenance costs incident thereto.

As best shown in FIG. 2, the bearing elements 14 extending upwardly from the belt are fingerlike and engage the material being conveyed to thereby assist in moving the material through the conduit.

In accordance with this invention, the fingers 14 may be constructed from materials different from that of the belt and are, in fact, expressly selected to provide the belt with easy sliding against the conduit walls.

Thus, while the belt may be made from a reenforced rubberlike material having a relatively high coefficient of friction, the bearing elements are constructed from a hard, durable plastic type material having a substantially lower coefficient of friction.

Although the members extending below the belt's surface have a size and shape different from that of the upper members, they are constructed from the same types of low-coefficient of friction material and serve in essentially the same capacity as do the upper members; that is, they space the belt from the conduit and slidably contact the conduit walls, thus reducing friction and lowering operating power requirements while increasing belt life.

Illustratively, when the working run of the belt passes through the conduit in contact with its bottom wall or when the belt makes a downward turn, the lower bearing members support the belt in sliding contact with the conduit walls. When the belt makes an upward or reverse turn or when the return run passes through the conduit, the upper slide members contact the conduit walls to keep the belt spaced therefrom.

As shown in FIG. 2, the upper and lower bearing members are held firmly in position on the belt by connecting stems 42 which pass through openings in the belt.

In the modification illustrated in FIGS. 3 and 4, an already existing molded nubbed belt 46 has been modified by adding tips 48 and base members 50 made from a suitable low-friction bearing material. The tips and base members may be permanently attached to the nubs by neck members or stems 52 and 53 respectively or may be detachable for easy replacement when they become worn. In this modification, only part of the fingers are tipped, but their resulting increased length spaces the untipped fingers away from the upper conduit wall.

In FIG. 5, a still further modification is shown wherein the nubbed belt is provided with side flanges 60 to retain extremely fine or flowable materials on the working surface of the belt. The replaceable tips 48 and base members 50 shown in FIG. 4 have been replaced with transverse ribs 66 and 68 having a height and width sufficient to space the belt surfaces and/or fingers from the conduit walls. By extending the ribs beyond both edges of the belt, the outer ends of the ribs act as bearings against the conduit's sidewalls.

In still another embodiment of this invention, as shown in FIG. 6, guidance of the conveyor belt is achieved by substantially parallel spaced-apart longitudinal guide strips 70 and 72 along the upper surface of the inner wall 32 of the conduit 26. A flanged nubbed belt 74 having low-friction slide members 15 and 18 connected by stems 33 extending from its upper and lower surfaces respectively is trained through the conduit with the outer rows of the lower slide members adjacent the guide strips so that their lateral movement is restricted thereby. This limits lateral belt movement and maintains the belt edges spaced from the conduit sidewalls 34.

Figure 7:
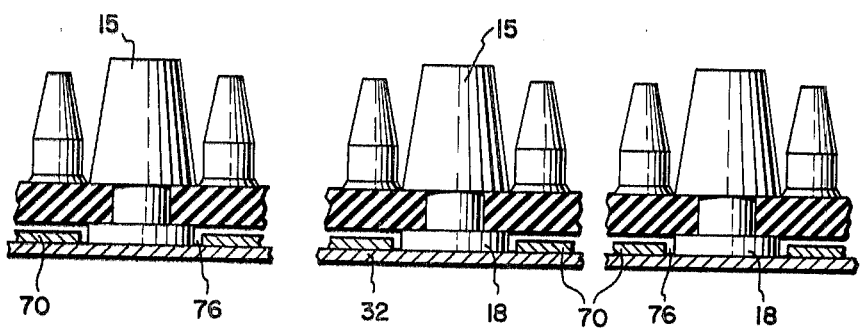

In the embodiment illustrated in FIG. 7, a plurality of relatively shallow guide channels 76 are formed on the inner wall 32, one for each row of lower slide members 18. Such channels may be conveniently formed by aligning a plurality of parallel longitudinal strips 70 along the surface of inner wall 32. The depth of the channels is less than the thickness of the slide members so that the latter may still hold the belt away from the wall 32 while still providing the limited bearing surface for the belt.

While the invention has been described with reference to several specific embodiments, it should be understood that certain changes in construction may be made by one skilled in the art and would not thereby depart from the spirit and scope of this invention, which is limited only by the claims appended hereto.

What is claimed is:

1. A conveyor belt comprising a flexible belt having a working surface, a plurality of spaced-apart material-engaging projections extending upward from said working surface and a plurality for low-friction bearing elements extending above the tops of the material-engaging projections, said low-friction bearing elements having a coefficient of friction substantially lower than that of said material-engaging projections.

2. A belt conveyor comprising an endless belt trained about spaced-apart pulleys and having a working run and a return run, a curved conduit enclosing the working run of the belt, spaced-apart material-engaging projections extending upward from the upper surface of said belt and a plurality of low-friction bearing elements extending above the tops of the material-engaging projections for maintaining the material-engaging projections in spaced relationship to the walls of said conduit, said low-friction bearing elements having a coefficient of friction substantially lower than that of said material-engaging projections.

3. Apparatus according to claim 2 with the addition of plurality of spaced-apart, low-friction bearing elements on the lower surface of said belt to maintain said surface in spaced relationship to the walls of the conduit.

4. Apparatus according to claim 3 wherein the bearing elements are secured to the top and bottom surfaces of said belt by stems passing through said belt.

5. Apparatus according to claim 4 wherein the bearing elements extending from at least one of said top and bottom surfaces of said belt comprise ribs extending transversely of said belt.

6. Apparatus for conveying materials at various angles of inclination, comprising a molded, endless flexible belt, trained about spaced-apart pulleys and having material-engaging projections extending from the upper surface thereof, walled conduits separately enclosing the working and return runs of said belts, means for moving said belt through said conduit, and a plurality of spaced-apart, low-friction bearing members on said upper surface extending above said material-engaging projections and adapted to slidably contact the wall of said conduit to provide a bearing thereagainst while maintaining said material-engaging projections in spaced relationship thereto.

7. Apparatus according to claim 6 wherein said belt is provided with a plurality of spaced-apart, low-friction bearing elements projecting from the belt's under surface for slidably contacting the wall of said conduit while maintaining said surface in spaced relationship to said wall.

8. Apparatus according to claim 7 wherein the bearing members are detachably secured to the belt by intermediate stems passing through said belt.

9. Apparatus according to claim 6 wherein the low-friction bearing members are tipped extensions detachably mounted to the top of the plurality of material-engaging projections.

10. Apparatus according to claim 7, with the addition of longitudinal guide means on an inner surface of said conduit forming at least one relatively shallow channel for receiving at least part of said low-friction bearing elements projecting from the belt's undersurface.

11. The conveyor belt of claim 1, including low-friction bearing elements extending below the bottom surface of said belt.